US007740905B2

(12) United States Patent
Jabado et al.

(10) Patent No.: US 7,740,905 B2
(45) Date of Patent: Jun. 22, 2010

(54) NOZZLE ARRANGEMENT AND METHOD FOR COLD GAS SPRAYING

(75) Inventors: Rene Jabado, Berlin (DE); Jens Dahl Jensen, Berlin (DE); Ursus Krüger, Berlin (DE); Daniel Körtvelyessy, Berlin (DE); Volkmar Lüthen, Berlin (DE); Ralph Reiche, Berlin (DE); Michael Rindler, Schöneiche (DE); Raymond Ullrich, Schönwalde (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/087,721

(22) PCT Filed: Dec. 15, 2006

(86) PCT No.: PCT/EP2006/069769

§ 371 (c)(1),
(2), (4) Date: Nov. 20, 2008

(87) PCT Pub. No.: WO2007/080042

PCT Pub. Date: Jul. 19, 2007

(65) Prior Publication Data

US 2009/0155461 A1    Jun. 18, 2009

(30) Foreign Application Priority Data

Jan. 10, 2006    (EP)    ................... 06000402

(51) Int. Cl.
   *B05D 1/12*    (2006.01)
   *B05B 7/06*    (2006.01)
(52) U.S. Cl. ............... 427/180; 427/421.1; 427/189; 118/308; 118/311
(58) Field of Classification Search ............... 427/180, 427/421.1; 118/311, 308
See application file for complete search history.

(56) References Cited

U.S. PATENT DOCUMENTS 5,795,626 A *   8/1998   Gabel et al. ............... 427/458
2004/0166247 A1 *   8/2004   Heinrich et al. ........... 427/446

FOREIGN PATENT DOCUMENTS

DE    10126100 A1    12/2002
WO    WO 2005079209 A2    9/2005

* cited by examiner

*Primary Examiner*—Frederick J Parker (57) ABSTRACT

The invention relates to a method of, and a nozzle arrangement for, spraying cold gas. The nozzle arrangement has a first nozzle and a second nozzle, which is arranged within the first nozzle. The first nozzle is fed a gas which optionally contains particles. The second nozzle is fed a particle-containing gas. The particles are applied to a surface of the substrate by means of the gases.

18 Claims, 6 Drawing Sheets

NOZZLE ARRANGEMENT AND METHOD FOR COLD GAS SPRAYING

CROSS REFERENCE TO RELATED APPLICATIONS

This application is the US National Stage of International Application No. PCT/EP2006/069769, filed Dec. 15, 2006 and claims the benefit thereof. The International Application claims the benefits of European application No. 06000402.5 filed Jan. 10, 2006, both of the applications are incorporated by reference herein in their entirety.

FIELD OF INVENTION

The present invention relates to a nozzle arrangement and to a method for producing a coating on a surface of a substrate by means of cold gas spraying, as well as to the coatings produced by the nozzle arrangement and the method.

BACKGROUND OF THE INVENTION

It is known that for the cold gas spraying method (Cold-Spray™, "Kinetic Gas Spray", see DE 69016433 T2, EP 0 484 553 A1, U.S. Pat. No. 5,302,414 A1, US 2004/037954, EP 0 924 315 B1, EP 1 132 497 A1, U.S. Pat. No. 6,502,767 B2), for coating purposes, the powdered materials employed must have particle sizes of >5 μm, ideally from 20 to 40 μm. For kinetic energy reasons, the direct spraying of nanoparticulate materials in order to achieve directly nanostructured or thin-layer coatings (<1 μm) is not possible. Particles with sizes <5 μm will not be incorporated into the layers; rather, even before impact on the substrate they will preferentially be deflected laterally by the stagnation pressure being formed in front of the substrate. It is furthermore known that continuously accelerated carrier gas flows in the ultrasonic range, restricted to 2000 m/s, are used in the cold gas spraying method.

U.S. Pat. No. 6,124,563 A1 and U.S. Pat. No. 6,630,207 B1 describe pulsed thermal spraying methods (pulsed HVOF, pulsed Railgun, pulsed electrothermal & plasma spraying methods) with which particle velocities >>2000 m/s can be achieved. Improved layer properties and layer systems can thereby be produced, which hitherto were not achievable owing to low particle velocities.

DE 103 19 481 A1 and WO 03/041868 A2 describe special nozzle designs for cold gas spraying methods. EP 1 132 497 A1 describes unrelatedly the effect of pulsating particle dosing.

SUMMARY OF INVENTION

It is an object of the present invention to improve a cold spraying device so that its use allows new layer systems, and coatings with improved layer properties can be produced.

According to the invention, this object is achieved by the nozzle arrangement as claimed in the claim.

It is another object of the present invention to provide a method with which new layer systems and coatings with improved layer properties can be produced.

This object is achieved according to the invention by a method as claimed in the claims.

It is a further object of the present invention to provide a coating on a substrate, which is improved compared to the prior art.

This object is achieved according to the invention by a coating as claimed in the claims.

The nozzle arrangement according to the invention comprises a first nozzle and a second nozzle, which is arranged inside the first nozzle, and it is therefore configured as a 2-duct nozzle. The gas flow generated by the first nozzle envelops the gas flow generated by the second nozzle, so that particles contained in the envelope gas flow cannot be deflected outward. In order to prevent deflection in any direction, the second nozzle is preferably arranged essentially in the first nozzle.

An arrangement according to the invention with two nozzles has the advantage that the gas flow generated by the first nozzle forms an envelope for the gas flow which is generated by the second nozzle. The particles that are contained in the gas which is delivered to the second nozzle have particle sizes of <50 μm, the particle size used preferably being <5 μm, more preferably <1 μm. The formation of an envelope prevents the particles with a particle size <5 μm, in particular <1 μm, from being deflected outward by the stagnation pressure in front of the substrate to be coated, so that particles with a smaller particle size can expediently be incorporated into cold-sprayed layers by the device according to the invention. The nozzle arrangement therefore makes it possible to produce coatings with nanoparticles. In the context of the present invention, the term nanoparticles refers to particles with a particle size <5 μm, in particular <1 μm.

In a preferred embodiment, the first nozzle is a cylindrical nozzle.

The second nozzle in a preferred embodiment may be a nozzle which has a converging section and a diverging section, more preferably a Laval nozzle. A Laval nozzle conventionally has the shape of a double cone and an expansion ratio (ratio of the outlet cross section to the narrowest cross section) of from 6 to 9.

The cross section of the second nozzle may have any conceivable shape, although it is preferable to use a nozzle with a rectangular, parallelepipedal, elliptical or circular cross section. The configuration of the cross section of the second nozzle may however vary along its length, so that combinations of the aforementioned cross-sectional shapes are also used. In this embodiment, the internal and external cross sections of the second nozzle are configured equally, i.e. the external diameter of the second nozzle depends in a constant function on the internal diameter of the second nozzle.

In another embodiment the cross section of the second nozzle must be different between the internal cross section and the external cross section of the nozzle, because in this embodiment the internal cross section is configured differently to the external cross section of the second nozzle. The internal cross section and the external cross section of the second nozzle have the shapes described above. The shape of the internal cross section, however, is different to the shape of the external cross section. For example, the internal cross section is rectangular while the external cross section is circular.

The first nozzle may have a constant or varying internal diameter. For example, the first nozzle is configured as an expansion nozzle. The first nozzle may, however, also have a converging section. In another configuration, the first nozzle has a converging section and a diverging section. Preferably, the internal diameter of the first nozzle is constant and the nozzle is configured cylindrically. The internal diameter of the first nozzle lies between 3 and 50 mm², preferably 5 and 30 mm², more preferably 7 and 20 mm².

The size of the second nozzle is adapted to the internal diameter of the first nozzle so that the distance from the external cross section of the second nozzle to the internal diameter of the first nozzle is at least 1 mm, preferably between 2 mm and 10 mm.

The overall length of the first nozzle lies between 60 and 300 mm, preferably between 100 and 200 mm. The overall length of the second nozzle is between 60 and 300 mm, preferably between 100 and 200 mm. The overall length of the first nozzle in a preferred embodiment of the invention is equal to the overall length of the second nozzle. In another embodiment of the invention, the overall length of the first nozzle is greater than the overall length of the second nozzle. In a further configuration of the invention, the overall length of the first nozzle is less than the overall length of the second nozzle.

Both the first nozzle and the second nozzle may consist of a ceramic, a plastic, a metal or a metal alloy, which each may be coated. The choice of the nozzle material is dictated by the gases and particles being used. The nozzles are advantageously made in at least two parts.

In order to coat a substrate by means of a cold gas spraying method, a gas is delivered to the first nozzle and a gas containing particles is delivered to the second nozzle. The gases are applied onto the surface of the substrate by means of the gases.

All known spraying materials, for example ceramics, metals, metal alloys, composite materials or plastics may be used as the particles.

The particles may have a uniform particle size, although they do not have to. The particle size may be up to 50 µm. The respective gas is compressed, and it is expanded in the nozzle so that the gas is accelerated to ultrasonic velocity. The respective gas may have a temperature of from 30 to 1000° C., preferably from 100 to 800° C., and it is preferably nitrogen, helium, argon, air, neon, krypton, xenon, oxygen, carbon dioxide or mixtures thereof. High gas velocities, which are required for cold spraying, can be achieved with such gases.

The gas which is selected for delivery to the first nozzle may be the same gas which is selected for delivery to the second nozzle. Nevertheless, different gases may be selected for the two nozzles.

The gas velocities may be selected and adjusted freely. The gas, or the gas/particle mixture, is expanded in the respective nozzle so that gas velocities of up to 3000 m/s and optionally particle velocities of up to 2000 m/s can be achieved.

In one embodiment the gas which is delivered to the first nozzle contains no particles, while the gas which is delivered to the second nozzle contains particles. This embodiment is particularly suitable for incorporating particles with a particle size <5 µm, in particular <1 µm, into cold-sprayed layers. The gas flow coming from the first nozzle forms an envelope for the gas containing particles, and it prevents the particles from being deflected by the stagnation pressure in front of the substrate.

In another embodiment, the gas which is delivered to the first nozzle contains particles that preferably have a particle size of from 5 to 50 µm. The gas which is delivered to the second nozzle has particles with a particle size <50 µm, preferably <5 µm, more preferably <1 µm.

The velocity of a particle depends on its size and physical density, as well as the type of gas being used and on the state variables of this gas. By varying the particles used and the gases used, it is possible to produce layers which are graded or multilayered, or which vary in composition. By selecting a particle size <1 µm, nanostructured coatings can be produced.

Vortices can deliberately be generated at the interface by varying the relative velocities of the two gas flows, which lead to effective mixing of the particles contained in the gas flows. Graded coatings can thereby be produced particularly easily.

Coatings which are produced by using the nozzle arrangement described above and the method described above have improved layer properties compared to the prior art. The layers produced by the nozzle arrangement according to the invention adhere very well on substrates, for example of ceramic, metal, metal alloys, plastics, glass or composite materials; they are pore-free and have a smooth surface, so it is not necessary to post-process the layers being produced. The coatings according to the invention have a high hardness.

In particular, coatings with particles having a particle size <5 µm, in particular <1 µm, may be produced by the aforementioned nozzle arrangement and the aforementioned method. It is thereby possible to produce layers with a small thickness.

BRIEF DESCRIPTION OF THE DRAWINGS

The invention will be explained in more detail below. The following examples and embodiments do not restrict the invention.

DETAILED DESCRIPTION OF INVENTION

Figure 1:
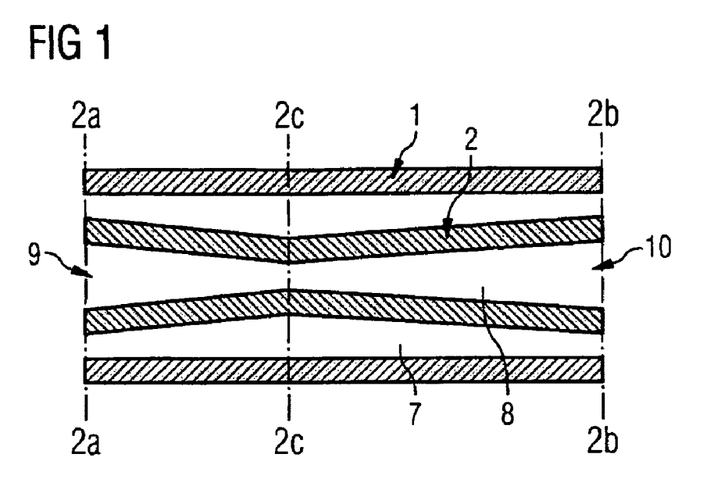
FIG. 1 shows a side view of a nozzle arrangement according to the invention.

FIG. 1 shows an embodiment of the nozzle arrangement according to the invention for a cold spraying gas device in a schematic representation. The nozzle arrangement of the first embodiment comprises a cylindrical first nozzle 1 and a second nozzle 2, arranged inside the cylindrical nozzle. In the cylindrical nozzle 1, not only the outer surface but also the inner surface has the shape of a cylinder wall, so that it has both a constant internal diameter and a constant external diameter. The second nozzle 2, which will be referred to below as the inner nozzle, in contrast to the cylindrical nozzle is configured as a Laval nozzle with a converging section and a diverging section. Between the inner surface of the cylindrical nozzle 1 and the outer surface of the inner nozzle 2, there is therefore an outer flow channel 7 with variable flow cross section which has the greatest flow cross section a little outside the axial middle of the nozzle arrangement. The inner surface of the inner nozzle 1 on the other hand delimits an inner flow channel 8 which has its smallest cross section, i.e. a constriction, where the outer flow channel 7 has its greatest cross section.

Figure 2A:
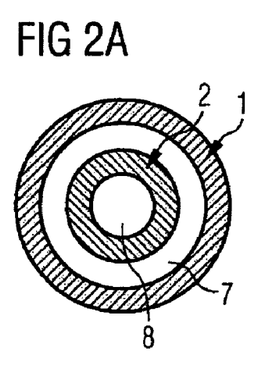
FIGS. 2a, 2b, 2c are cross-sectional views of the inventive nozzle arrangement according to FIG. 1 at various positions of the nozzle arrangement.
Figure 2B:
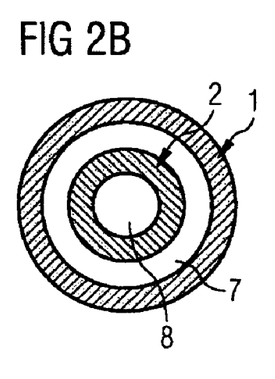
Figure 2C:
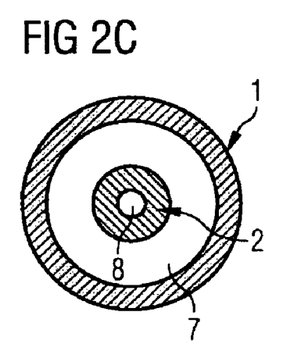

FIG. 2a shows the cross sections of the cylindrical nozzle 1 represented in FIG. 1 and of the inner nozzle 2 at the gas inlet end 9, while FIG. 2b shows the cross sections of the cylindrical nozzle 1 and of the inner nozzle 2 at the gas outlet end 10. FIG. 2c shows the cross section of the nozzle arrangement in the vicinity of the constriction of the inner flow channel 8. All the cross sections have a circular configuration.

The nozzle arrangement shown in FIGS. 1, 2a and 2b is suitable in particular for carrying out the method according to the invention in which the gas, which is delivered to the cylindrical nozzle 1, contains particles with a particle size that lies essentially between 5 and 20 µm, and the gas which is delivered to the inner nozzle 2 contains particles with a particle size which are essentially <5 µm.

For the cold spraying in a method according to the invention, for example a mixture of copper particles and compressed nitrogen is delivered to the cylindrical nozzle 1 i.e. the outer flow channel 7 and is expanded, while a mixture of aluminum powder and compressed air is delivered to the inner nozzle 2 i.e. the inner flow channel 8 and is expanded. The gases and particles are accelerated owing to the expansion of the gases, and the copper and aluminum particles are thus applied onto a steel substrate. A nanostructured coating is thereby obtained, which has very good adhesion properties and is smooth and pore-free.

Figure 3:
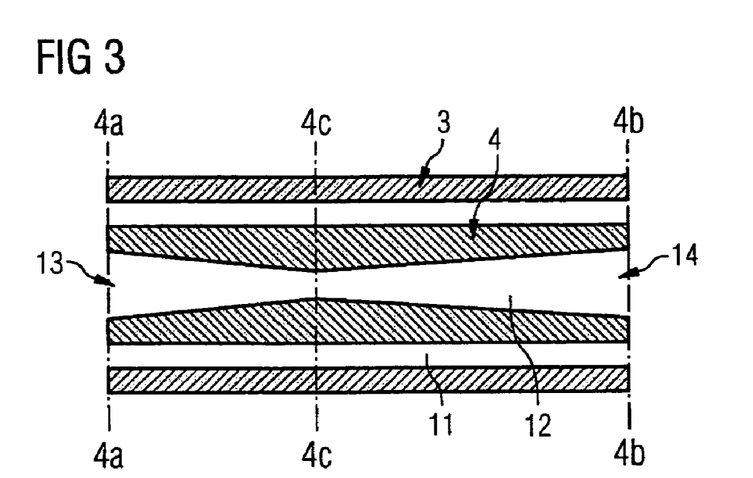
FIG. 3 shows a side view of a further nozzle arrangement according to the invention.

FIG. 3 shows another embodiment of the nozzle arrangement according to the invention in a schematic representation. The first nozzle 3 is a cylindrical nozzle which encloses the second nozzle 4, referred to below as the inner nozzle. The cylindrical nozzle 3 has a constant internal and external diameter, and it corresponds in its configuration to the cylindrical nozzle 1 of the first embodiment. The inner nozzle 4 is again a Laval nozzle which has an internal cross section with a converging section and a diverging section, and an external cross section with a constant diameter.

Between the inner nozzle 4 and the cylindrical nozzle 3, an annular outer flow channel 11 is formed which has a constant flow cross section along the axial direction of the nozzle arrangement. The inner flow channel 12 delimited by the inner surface of the Laval nozzle 4 has a round flow cross section at the gas inlet end 13 of the nozzle arrangement, while it has a rectangular cross section at the gas outlet end 14 of the nozzle arrangement. Between the gas inlet end 13 and the gas outlet end 14 the inner flow channel 12 has a constriction, in the vicinity of which a smooth transition from round to rectangular cross section occurs in the present exemplary embodiment.

Figure 4A:
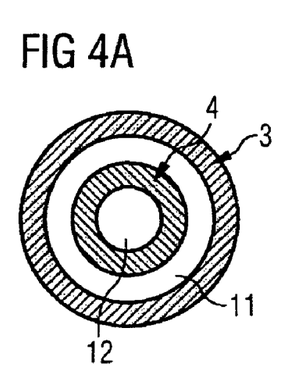
FIGS. 4a, 4b, 4c are cross-sectional views of the inventive nozzle arrangement according to FIG. 3 at various positions of the nozzle arrangement.

FIG. 4a shows the cross sections of the cylindrical nozzle 3 represented in FIG. 3 and the inner nozzle 4 at the gas inlet end 13. The internal and external cross sections at the gas inlet end have a circular configuration.

Figure 4B:
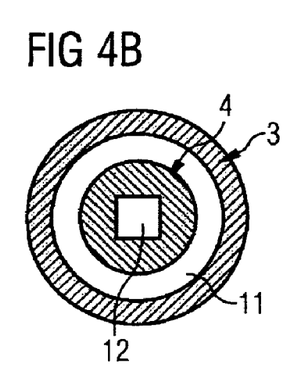

FIG. 4b shows the cross sections of the cylindrical nozzle 3 and the inner nozzle 4 at the gas outlet end 14. The internal and external cross sections of the cylindrical nozzle 3 are cylindrical. The external cross section of the inner nozzle 4 is likewise circular, while the internal cross section of the inner nozzle 4 is rectangular.

Figure 4C:
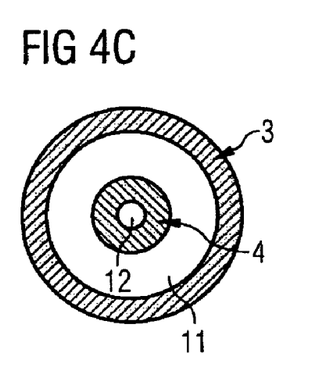

FIG. 4c shows the cross sections of the cylindrical nozzle 3 and the inner nozzle 4 in the vicinity of the constriction of the inner flow channel 12, where the transition from round to rectangular cross section occurs.

The nozzle arrangement shown in FIGS. 3, 4a and 4b is suitable in particular for carrying out the method according to the invention in which the gas, which is delivered to the cylindrical nozzle 3, contains particles with a particle size that lies essentially between 20 and 40 µm, and the gas which is delivered to the inner nozzle 4 contains particles with a particle size which is essentially <5 µm, in particular <1 µm.

For the cold spraying in a method according to the invention, for example a mixture of a copper-aluminum alloy and compressed air is delivered to the cylindrical nozzle 3 and is expanded, while a mixture of aluminum powder and compressed air is delivered to the inner nozzle 4 and is expanded. Gases and particles are accelerated by the expansion of the gases. The copper-aluminum alloy and the aluminum particles are thus applied onto a steel substrate. The layer obtained on the substrate is graded, adhesive, smooth and pore-free.

Figure 5:
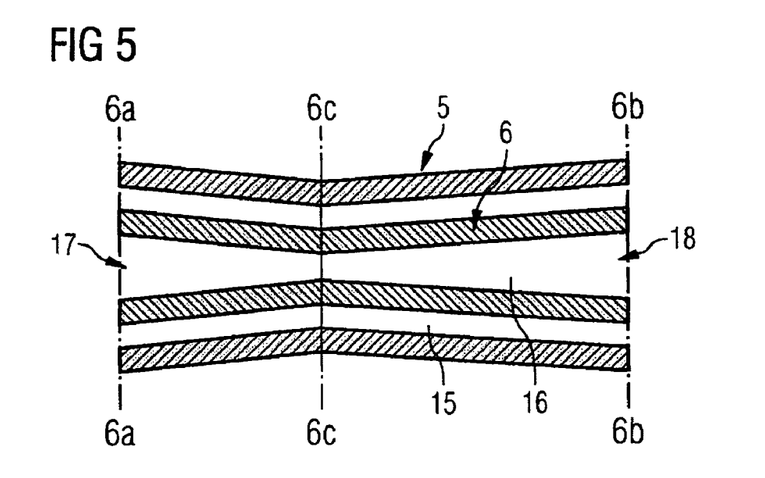
FIG. 5 shows a side view of a further nozzle arrangement according to the invention.

FIG. 5 shows yet another embodiment of the nozzle arrangement according to the invention. It comprises a first, outer nozzle 5 which is not configured cylindrically and which encloses a second nozzle 6, referred to below as the inner nozzle. The outer nozzle 5 and the inner nozzle 6 have a converging section and a diverging section, the outer contour of the inner nozzle 6 being adapted to the inner contour of the outer nozzle 5. The configuration of the inner nozzle 6 corresponds to the configuration of the inner nozzle 1 of the first embodiment.

In the present embodiment the distance of the outer surface of the inner nozzle 6 from the inner surface of the outer nozzle 5 is constant, so that the outer flow channel 15 formed between the inner nozzle 6 and the outer nozzle 5 has a constant cross-sectional area along the axial direction of the nozzle arrangement. The inner flow channel 16 delimited by the inner surface of the inner nozzle 6, on the other hand, has a constriction like the inner flow channel 8 of the first embodiment.

Figure 6A:
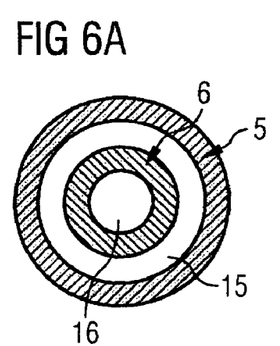
FIGS. 6a, 6b, 6c are cross-sectional views of the inventive nozzle arrangement according to FIG. 5 at various positions of the nozzle arrangement.
Figure 6B:
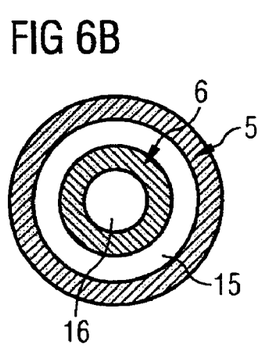
Figure 6C:
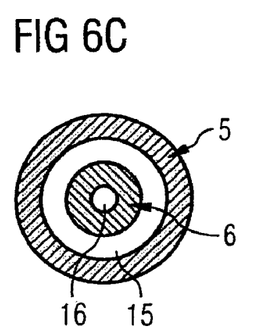

FIG. 6a shows the cross sections of the outer nozzle 5 represented in FIG. 5 and of the inner nozzle 6 at the gas inlet end 17. All the cross sections are circular. FIG. 6b shows the cross sections of the outer nozzle 5 and of the inner nozzle 6 at the gas outlet end 18 of the nozzle arrangement. All the cross sections are circular. FIG. 6c shows the cross section of the nozzle arrangement in the vicinity of the constriction of the inner flow channel 8.

The nozzle arrangement shown in FIGS. 5, 6a and 6b is suitable in particular for carrying out the method according to the invention, in which the gas which is delivered to the outer nozzle 5 contains no particles, and the gas which is delivered to the inner nozzle 6 contains particles with a particle size which are essentially <5 µm, in particular <1 µm, because in this embodiment the gas flow from the first nozzle 5 envelops the gas flow from the second nozzle 6 uniformly on all sides.

For the cold spraying in a method according to the invention, for example compressed nitrogen is delivered to the outer nozzle 5 and is expanded, while a mixture of aluminum powder with a particle size <5 µm, in particular <1 µm, and compressed air is delivered to the inner nozzle 6 and is expanded. Gases and particles are accelerated by the expansion of the gases. The aluminum particles are thus applied onto a steel substrate and a tough, smooth coating of nanoparticles is produced. The coating has a small thickness and is pore-free.

The cold gas spraying methods described with reference to the various embodiments merely represent examples of possible applications of the respective nozzle arrangement. The respectively described methods may however in principle also be carried out with the other embodiments of the nozzle arrangement.

The method according to the invention and the nozzle arrangement according to the invention may in particular be used to produce coatings on turbine components such as turbine blades, in particular gas turbine blades. An overview of a gas turbine system is therefore given below.

Figure 7:
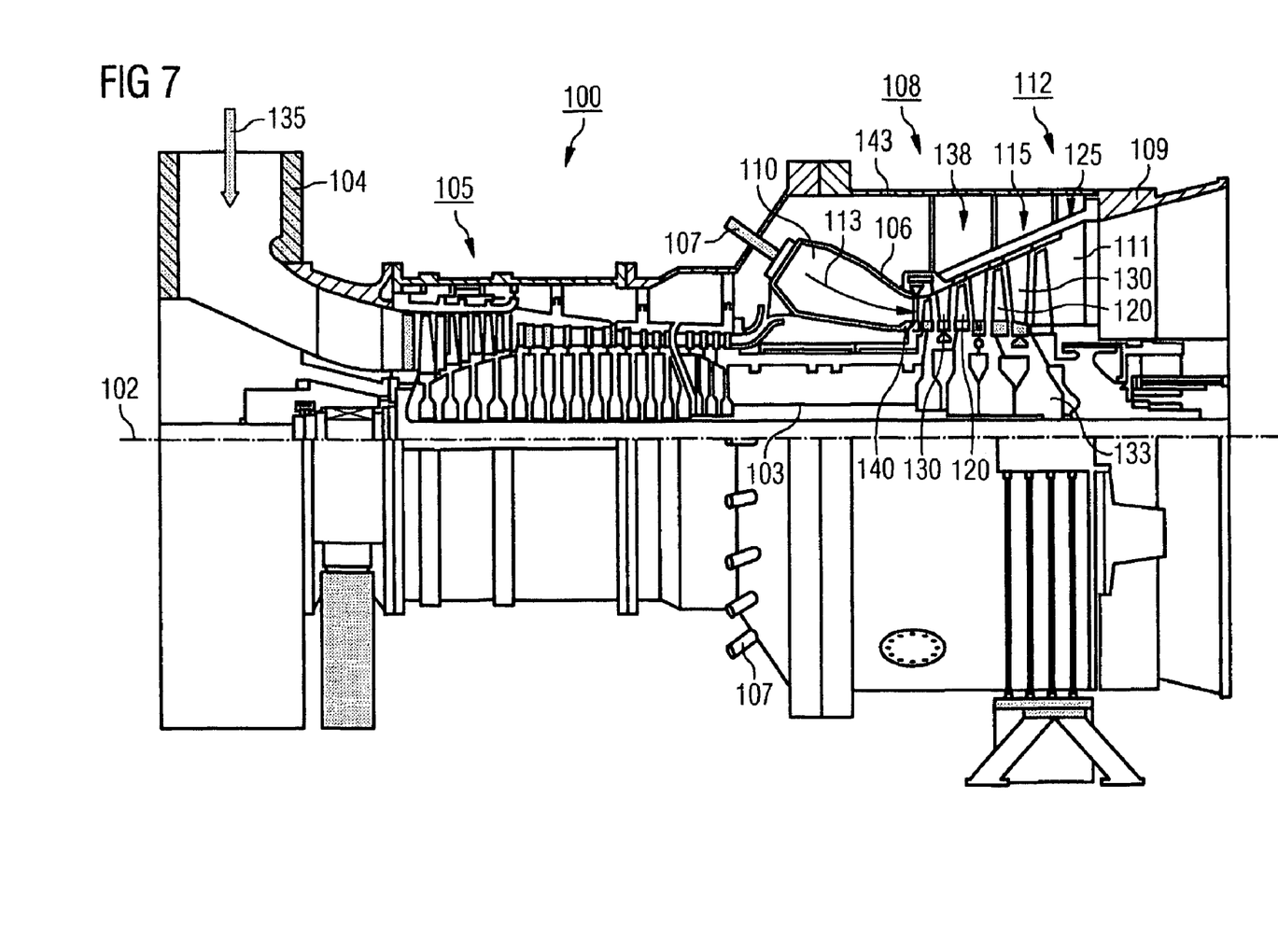
FIG. 7 shows a gas turbine by way of example in a partial longitudinal section.

FIG. 7 shows a gas turbine 100 by way of example in a partial longitudinal section. The gas turbine 100 internally comprises a rotor 103, which will also be referred to as the turbine rotor, mounted so as to rotate about a rotation axis 102. Successively along the rotor 103, there are an intake manifold 104, a compressor 105, an e.g. toroidal combustion chamber 110, in particular a ring combustion chamber, having a plurality of burners 107 arranged coaxially, a turbine 108 and the exhaust manifold 109.

The ring combustion chamber 106 communicates with an e.g. annular hot gas channel 111. There, for example, four successively connected turbine stages 112 form the turbine 108.

Each turbine stage 112 is formed for example by two blade rings. As seen in the flow direction of a working medium 113, a guide vane row 115 is followed in the hot gas channel 111 by a row 125 formed by rotor blades 120.

The guide vanes 130 are fastened on an inner housing 138 of a stator 143 while the rotor blades 120 of a row 125 are fitted on the rotor 103, for example by means of a turbine disk 133.

Coupled to the rotor 103, there is a generator or a work engine (not shown).

During operation of the gas turbine 100, air 135 is taken in and compressed by the compressor 105 through the intake manifold 104. The compressed air provided at the end of the compressor 105 on the turbine side is delivered to the burners 107 and mixed there with a fuel. The mixture is then burnt to form the working medium 113 in the combustion chamber 110.

From there, the working medium 113 flows along the hot gas channel 111 past the guide vanes 130 and the rotor blades 120. At the rotor blades 120, the working medium 113 expands by imparting momentum, so that the rotor blades 120 drive the rotor 103 and the work engine coupled to it.

During operation of the gas turbine 100, the components exposed to the hot working medium 113 experience thermal loads. Apart from the heat shield elements lining the ring combustion chamber 110, the guide vanes 130 and rotor blades 120 of the first turbine stage 112, as seen in the flow direction of the working medium 113, are heated the most.

In order to withstand the temperatures prevailing there, they may be cooled by means of a coolant.

Substrates of the components may likewise comprise a directional structure, i.e. they are monocrystalline (SX structure) or comprise only longitudinally directed grains (DS structure).

Iron-, nickel- or cobalt-based superalloys used as material for the components, in particular for the turbine blades 120, 130 and components of the combustion chamber 110. Such superalloys are known for example from EP 1 204 776 B1, EP 1 306 454, EP 1 319 729 A1, WO 99/67435 or WO 00/44949 are used; these documents are part of the disclosure.

The blades 120, 130 may likewise have coatings against corrosion (MCrAlX; M is at least one element from the group iron (Fe), cobalt (Co), nickel (Ni), X is an active element and stands for yttrium (Y) and/or silicon and/or at least one rare earth element, or hafnium). Such alloys are known from EP 0 486-489 B1, EP 0 786017 B1, EP 0412397 B1 or EP 1 306454 A1, which are intended to be part of this disclosure.

On the MCrAlX, there may furthermore be a thermal barrier layer which consists for example of $ZrO_2$, $Y_2O_3$—$ZrO_2$, i.e. it is not stabilized or is partially or fully stabilized by yttrium oxide and/or calcium oxide and/or magnesium oxide.

Rod-shaped grains are produced in the thermal barrier layer by suitable coating methods, for example electron beam deposition (EB-PVD).

The guide vane 130 comprises a guide vane root (not shown here) facing the inner housing 138 of the turbine 108, and a guide vane head lying opposite the guide vane root. The guide vane head faces the rotor 103 and is fixed on a fastening ring 140 of the stator 143.

Figure 8:
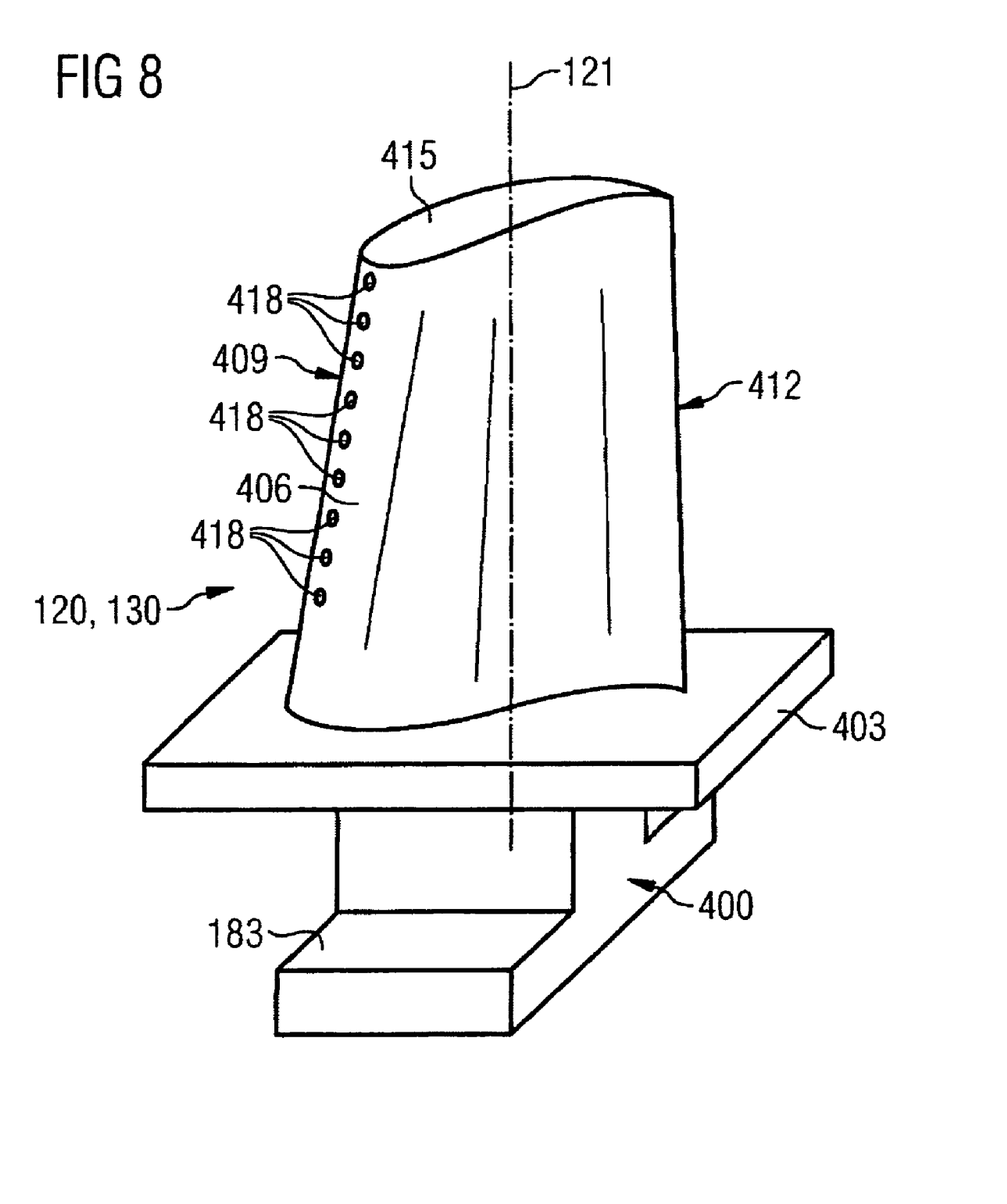
FIG. 8 shows a perspective view of a rotor blade or guide vane of a turbomachine.

FIG. 8 shows a perspective view of a rotor blade 120 or guide vane 130 of a turbomachine, which extends along a longitudinal axis 121.

The turbomachine may be a gas turbine of an aircraft or of a power plant for electricity generation, a steam turbine or a compressor.

The blade 120, 130 comprises, successively along the longitudinal axis 121, a fastening zone 400, a blade platform 403 adjacent thereto as well as a blade surface 406. As a guide vane 130, the vane 130 may have a further platform (not shown) at its vane tip 415.

A blade root 183 which is used to fasten the rotor blades 120, 130 on a shaft or a disk (not shown) is formed in the fastening zone 400.

The blade root 183 is configured, for example, as a hammerhead. Other configurations as a fir tree or dovetail root are possible.

The blade 120, 130 comprises a leading edge 409 and a trailing edge 412 for a medium which flows past the blade surface 406.

In conventional blades 120, 130, for example solid metallic materials, in particular superalloys, are used in all regions 400, 403, 406 of the blade 120, 130. Such superalloys are known for example from EP 1 204 776 B1, EP 1 306 454, EP 1 319 729 A1, WO 99/67435 or WO 00/44949; these documents are part of the disclosure. The blades 120, 130 may in this case be manufactured by a casting method, also by means of directional solidification, by a forging method, by a machining method or combinations thereof.

Workpieces with a monocrystalline structure or structures are used as components for machines which are exposed to heavy mechanical, thermal and/or chemical loads during operation. Such monocrystalline workpieces are manufactured, for example, by directional solidification from the melts. These are casting methods in which the liquid metal alloy is solidified to form a monocrystalline structure, i.e. to form the monocrystalline workpiece, or is directionally solidified. Dendritic crystals are in this case aligned along the heat flux and form either a rod crystalline grain structure (columnar, i.e. grains which extend over the entire length of the workpiece and in this case, according to general terminology usage, are referred to as directionally solidified) or a monocrystalline structure, i.e. the entire workpiece consists of a single crystal. It is necessary to avoid the transition to globulitic (polycrystalline) solidification in these methods, since nondirectional growth will necessarily form transverse and longitudinal grain boundaries which negate the beneficial properties of the directionally solidified or monocrystalline component. When directionally solidified structures are referred to in general, this is intended to mean both single crystals which have no grain boundaries or at most small-angle grain boundaries, and also rod crystal structures which, although they do have grain boundaries extending in the longitudinal direction, do not have any transverse grain boundaries. These latter crystalline structures are also referred to as directionally solidified structures. Such methods are known from U.S. Pat. No. 6,024,792 and EP 0 892 090 A1; these documents are part of the disclosure.

The blades 120, 130 may likewise have coatings against corrosion or oxidation (MCrAlX; M is at least one element from the group iron (Fe), cobalt (Co), nickel (Ni), X is an active element and stands for yttrium (Y) and/or silicon and/or at least one rare earth element, or hafnium (Hf)). Such alloys are known from EP 0 486 489 B1, EP 0 786 017 B1, EP 0 412 397 B1 or EP 1 306 454 A1, which are intended to be part of this disclosure.

On the MCrAlX, there may furthermore be a thermal barrier layer, which is preferably the outermost layer and consists for example of $ZrO_2$, $Y_2O_3$—$ZrO_2$, i.e. it is not stabilized or is partially or fully stabilized by yttrium oxide and/or calcium oxide and/or magnesium oxide. Rod-shaped grains are produced in the thermal barrier layer by suitable coating methods, for example electron beam deposition (EB-PVD).

Refurbishment means that components 120, 130 may need to have protective layers taken off (for example by sandblasting) after their use. The corrosion and/or oxidation layers or products are then removed. Optionally, cracks in the component 120, 130 are also repaired. The components 120, 130 are then recoated and the components 120, 130 are used again.

The blade 120, 130 may be designed to be a hollow or solid. If the blade 120, 130 is intended to be cooled, it will be hollow and optionally also comprise film cooling holes 418 (indicated by dashes).

Figure 9:
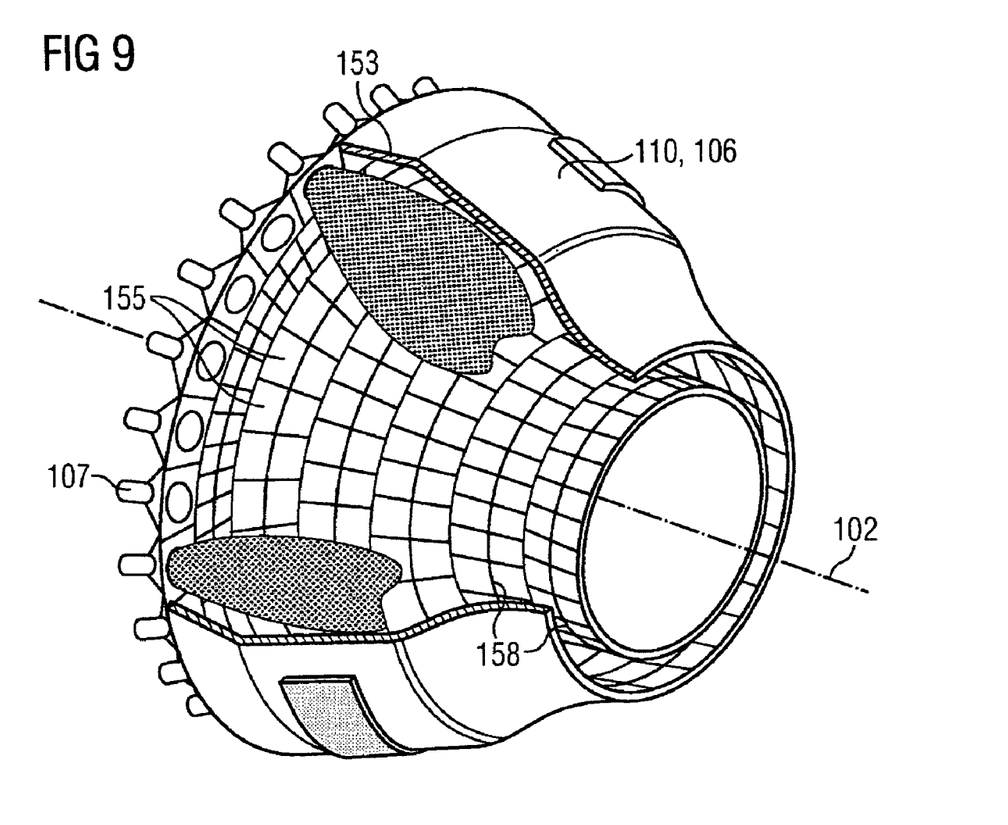
FIG. 9 shows a combustion chamber of a gas turbine system.

FIG. 9 shows a combustion chamber 110 of a gas turbine 100. The combustion chamber 110 is designed for example as a so-called ring combustion chamber, in which a multiplicity of burners 107 are arranged in the circumferential direction around a rotation axis 102, open into a common combustion chamber space. To this end, the combustion chamber 110 as a whole is designed as an annular structure which is positioned around the rotation axis 102.

In order to achieve a comparatively high efficiency, the combustion chamber 110 is designed for a relatively high temperature of the working medium M, i.e. about 1000° C. to 1600° C. In order to permit a comparatively long operating time even under these operating parameters which are unfavorable for the materials, the combustion chamber wall 153 is provided with an inner lining formed by heat shield elements 155 on its side facing the working medium M.

Each heat shield element 155 is equipped with a particularly heat-resistant protective layer on the working medium side, or is made of refractory material. This may comprise solid ceramic blocks or alloys with MCrAlX and/or ceramic coatings. The materials of the combustion chamber wall and coatings thereof may be similar to the turbine blades.

Owing to the high temperatures inside the combustion chamber 110, a cooling system may also be provided for the heat shield elements 155 or for their retaining elements.

The combustion chamber 110 is in particular configured for detecting losses of the heat shield elements 155. To this end, a number of temperature sensors 158 are positioned between the combustion chamber wall 153 and the heat shield elements 155.

The invention claimed is:

1. A nozzle arrangement for coating a substrate with cold gas spraying, said nozzle arrangement comprising:
   a first nozzle for delivering gas containing a first set of particles to be applied on a surface of the substrate; and
   a second nozzle for delivering gas containing a second set of particles to be applied on the surface of the substrate, said second nozzle being arranged inside the first nozzle wherein the second nozzle comprises a converging section and a diverging section;
   wherein a size of said first set of particles is greater than a threshold size, and a size of said second set of particles is less than the threshold size.

2. The nozzle arrangement as claimed in claim 1, wherein the second nozzle is arranged centrally in the first nozzle.

3. The nozzle arrangement as claimed in claim 2, wherein the first nozzle is a cylindrical nozzle.

4. The nozzle arrangement as claimed in claim 3, wherein the second nozzle is a Laval nozzle.

5. The nozzle arrangement as claimed in claim 4, wherein the first nozzle has a constant internal diameter.

6. The nozzle arrangement as claimed in claim 4, wherein the first nozzle has a varying internal diameter.

7. The nozzle arrangement as claimed in claim 6, wherein the second nozzle has a cross section with a rectangular, parallelepipedal, elliptical or circular shape.

8. The nozzle arrangement as claimed in claim 7, wherein the internal cross section of the second nozzle has the same shape as the external cross section of the second nozzle.

9. The nozzle arrangement as claimed in claim 7, wherein the internal cross section of the second nozzle has a different shape to the external cross section of the second nozzle.

10. The nozzle arrangement as claimed in claim 9, wherein the overall length of the first nozzle is equal to the overall length of the second nozzle.

11. The nozzle arrangement as claimed in claim 9, wherein the overall length of the first nozzle is less than the overall length of the second nozzle.

12. The nozzle arrangement as claimed in claim 9, wherein the overall length of the first nozzle is greater than the overall length of the second nozzle.

13. The nozzle arrangement as claimed in claim 12, wherein the first nozzle and the second nozzle consist of a ceramic, a plastic, a metal or a metal alloy.

14. The nozzle arrangement as claimed in claim 13, wherein the first nozzle and the second nozzle are coated.

15. A method for coating a substrate via cold gas spraying, comprising:
   delivering a gas containing a first set of particles to a first nozzle;
   delivering gas containing a second set of particles to a second nozzle wherein the second nozzle is arranged in the first nozzle; and
   applying the first and second set of particles onto a surface of the substrate via the gases;
   wherein a size of said first set of particles is greater than a threshold size, and a size of said second set of particles is less than the threshold size.

16. The method as claimed in claim 15, wherein the threshold size is 5 μm.

17. The method as claimed in claim 16, wherein the gas delivered to the first nozzle is selected from the group consisting of: nitrogen, helium, argon, air, neon, krypton, xenon, oxygen, carbon dioxide and mixtures thereof, and the gas delivered the second nozzle is selected from the group consisting of: nitrogen, helium, argon, air, neon, krypton, xenon, oxygen, carbon dioxide and mixtures thereof.

18. The method as claimed in claim 17, wherein the gas delivered to the first nozzle and the gas delivered the second nozzle are different.

* * * * *